United States Patent
Fukunaga

(10) Patent No.: US 6,226,129 B1
(45) Date of Patent: May 1, 2001

(54) IMAGING OPTICAL SYSTEM AND IMAGE FORMING APPARATUS

(75) Inventor: Hideki Fukunaga, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/385,037

(22) Filed: Aug. 30, 1999

(30) Foreign Application Priority Data

Sep. 30, 1998 (JP) .................................................. 10-278613

(51) Int. Cl.$^7$ .................................................. G02B 13/22
(52) U.S. Cl. .................... 359/663; 359/649; 359/651; 359/662; 359/740; 355/68; 355/63
(58) Field of Search ..................... 359/663, 649, 359/651, 662, 740; 355/67, 68, 63

(56) References Cited

U.S. PATENT DOCUMENTS

| | | | |
|---|---|---|---|
| 2,380,210 | * 7/1945 | Bennett | 359/663 |
| 3,565,511 | * 2/1971 | Dilworth | 359/663 |
| 4,571,603 | * 2/1986 | Hornbeck et al. | 347/239 |
| 4,863,250 | * 9/1989 | Ishizuka | 359/663 |
| 5,026,145 | * 6/1991 | Marui et al. | 359/663 |
| 5,625,495 | * 4/1997 | Moskovich | 359/663 |
| 5,905,596 | * 5/1999 | Watanabe | 359/663 |
| 5,914,818 | * 6/1999 | Tejada et al. | 359/663 |
| 6,115,194 | * 9/2000 | Yoneyama | 359/757 |
| 6,124,978 | * 9/2000 | Yoneyama | 359/649 |

FOREIGN PATENT DOCUMENTS

| | | | |
|---|---|---|---|
| 0 297 361 A2 | * 1/1989 | (EP) | 359/663 |
| 0 537 731 A1 | * 4/1993 | (EP) | 355/67 |
| 355028038 | * 2/1980 | (JP) | 359/740 |
| 357165810 | * 10/1982 | (JP) | 359/663 |
| 62-215915 | * 9/1987 | (JP) | 359/663 |
| 401303722 | * 12/1989 | (JP) | 359/649 |
| 10-16297 | 1/1998 | (JP) . | |

* cited by examiner

Primary Examiner—Georgia Epps
Assistant Examiner—Evelyn A. Lester
(74) Attorney, Agent, or Firm—Oliff & Berridge, PLC

(57) ABSTRACT

Disclosed is an imaging optical system and an image forming apparatus that provide a small-size design and high resolution. An optical system (telecentric optical system) between the composite focus 4d of an imaging surface side and a laser array 1 is divided into a second lens group 4b and a third lens group 4c and the distance $D_2$ between the third lens group 4c and the laser array 1 is shortened, whereby the spread of incident light into the third lens group 4c is reduced and the aperture of the third lens 4c is reduced. Also, the principal light beam 2a of beam 2 from the laser array 1 is bent at two stages, the second lens group 4b and the third lens group 4c, and the distance $D_1$ between the second lens group 4b and the third lens group 4c is increased, whereby the bend of the principal light beam 2a of the laser beam 2 in the second lens group 4b and the third lens group 4c is reduced, with the result that small aberration is obtained.

16 Claims, 14 Drawing Sheets

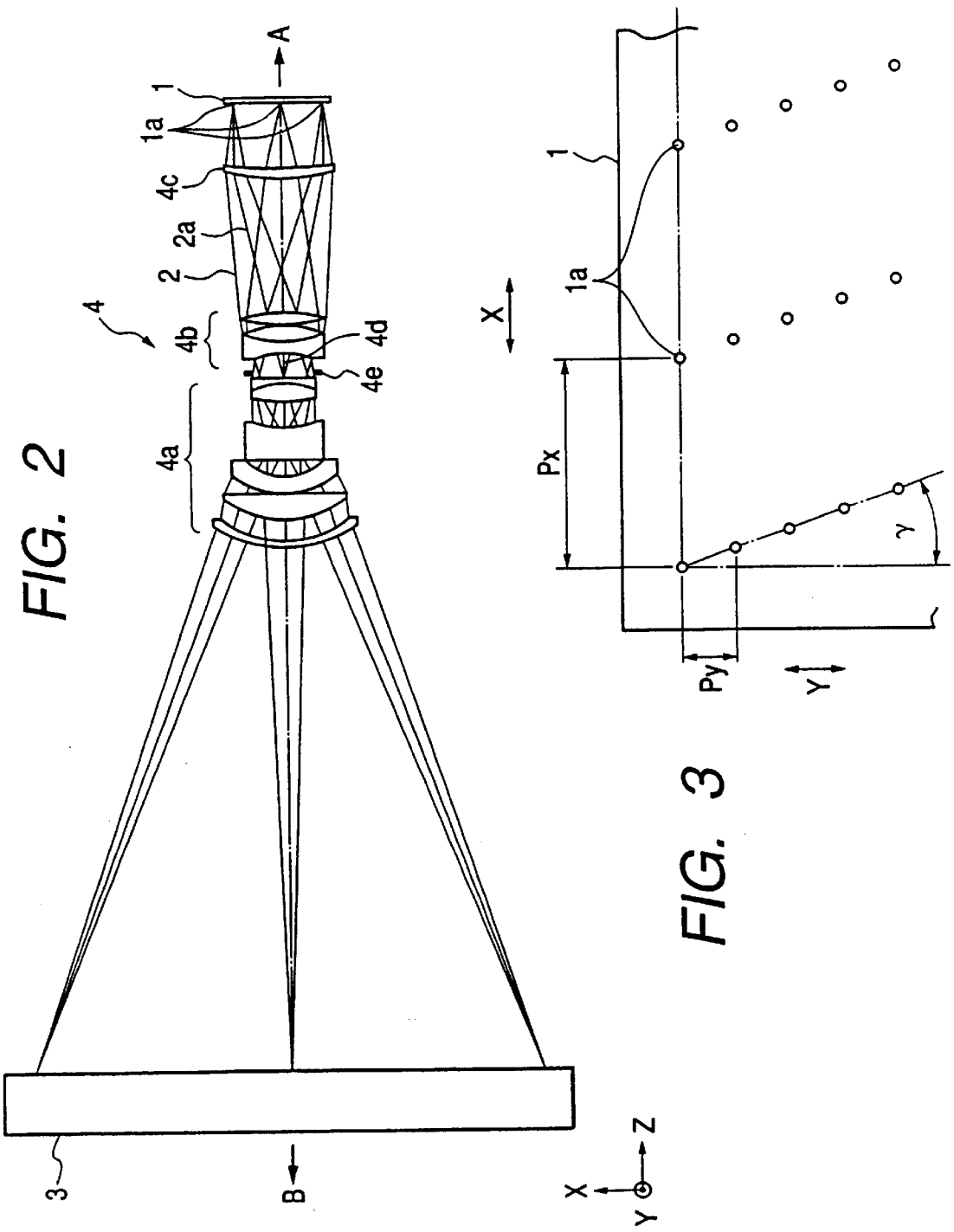

PUPIL HEIGHT

IMAGE HEIGHT

IMAGE HEIGHT

LATERAL ABERRATION DIAGRAMS

PUPIL HEIGHT

IMAGE HEIGHT

IMAGE HEIGHT

LATERAL ABERRATION DIAGRAMS

PUPIL HEIGHT

IMAGE HEIGHT

IMAGE HEIGHT

LATERAL ABERRATION DIAGRAMS

IMAGING OPTICAL SYSTEM AND IMAGE FORMING APPARATUS

BACKGROUND OF THE INVENTION

1. Field of the Invention

The present invention relates to an imaging optical system suitable for an image forming apparatus such as a copier and a printer that employ a semiconductor laser array having a plurality of independently controllable laser elements, and an image forming apparatus using the imaging optical system, and more particularly to an imaging optical system and an image forming apparatus that provide a small-size design and high resolution.

2. Description of the Prior Art

In an image forming apparatus such as a laser printer and a copier that scan a laser beam, a method of scanning by a polygon mirror is commonly used. However, image forming apparatuses employing the polygon mirror have a problem in that they cause mechanical vibration and noise because of the mechanical rotation of the mirror and a high scanning speed is difficult to achieve because of the low reliability of a motor for rotating the mirror and the limitation of rotation speed. Also, different scanning line densities, bent scanning lines, different scanning densities, or the like arise because of the surface inclination of each mirror, and the precision of manufacturing fθ lens, causing degradation of image quality. Accordingly, there is a demand for a method of scanning a laser beam without using such a polygon mirror.

A conventional image forming apparatus employing a method of scanning without using a polygon mirror is disclosed in Japanese Published Unexamined Patent Application No. Hei 10-16297, for example.

FIG. 15 shows the image forming apparatus. The image forming apparatus comprises a semiconductor laser array 1 as a light source having a plurality of laser elements 1a arranged linearly, and an imaging optical system 4 as an imaging optical system of a magnification optical system for imaging laser beams 2 from the laser elements 1a on a photosensitive surface 3a. The imaging optical system 4, which constitutes a telecentric optical system between the composite focus of the photosensitive surface 3a side and the light source, comprises a group of imaging lenses. By this construction, printing can be performed over a short side (an image width of 210 mm) A4 size at a rate of 200 dots per inch.

However, the conventional image forming apparatus has a problem in that, since the incidence surface of the telecentric optical system, located nearest to the light source, is distant from the light source, a laser beam incident on the telecentric optical system is spread, with the result that an effective diameter of lens must be increased, resulting in lenses being enlarged.

Also, there is a problem in that the short distance between the composite focus of the photosensitive surface side and the incidence surface of the telecentric optical system increases the bend of a principal light beam of the laser beam 2, with the result that high resolution cannot be obtained because of an increased aberration. Therefore, recently demanded resolutions of 600 dots or more per inch for A3 size cannot be achieved.

SUMMARY OF THE INVENTION

An object of the present invention is to provide an imaging optical system and an image forming apparatus that provide a small-size design and high resolution.

To achieve the above described object, the present invention offers an imaging optical system for imaging incident light coming vertically from a light source on a imaging surface, comprising: a first lens group disposed at the imaging surface side; a second lens group disposed with a stop sandwiched between the first lens group and the light source; and a third lens group disposed with a first distance provided between it and the second lens group and with a second distance smaller than the first distance provided between it and the light source, for forming the composite focus of the imaging surface side at the center of the stop in conjunction with the second lens group.

According to the above described construction, an optical system (telecentric optical system) between the composite focus of the imaging surface side and the light source is divided into the second lens group and the third lens group and the distance between the third lens group and the light source is shortened, whereby the spread of incident light into the third lens group is reduced and the aperture of the third lens is reduced. Also, the principal light beam of the incident light is bent at two stages, the second lens group and the third lens group, and the distance between the second lens group and the third lens group is increased, whereby the bend of the principal light beam of the incident light in the second lens group and the third lens group is reduced, with the result that small aberration is obtained.

To achieve the above object, the present invention provides an imaging optical system for imaging incident light coming vertically from a light source on an imaging surface by using a telecentric optical system comprising a plurality of lenses, wherein the telecentric optical system is constructed so that a relation of $1<2 \cdot S/L<2$ is satisfied, where S is the distance between a principal point of one of the plurality of lenses, located nearest to the light source, and the composite focus of the imaging surface side formed by the plurality of lenses, and L is the distance between the light source and the composite focus of the imaging surface side.

According the above described construction, increasing S/L shortens the distance between the incidence surface of the telecentric optical system, located nearest to the light source, and the light source, and reduces the spread of incident light into the incidence surface, with the result that the aperture of the telecentric optical system is reduced. Also, increasing S/L increases the distance between the incidence surface of the telecentric optical system, located nearest to the light source, and the composite focus of the imaging surface side, and reduces the bend of the principal light beam in the telecentric optical system, with the result that small aberration is obtained.

To achieve the above object, the present invention provides an imaging optical system for imaging incident light coming vertically from a light source on an imaging surface by using a telecentric optical system comprising a plurality of lenses, wherein the telecentric optical system is constructed so that the deflection angle of the principal light beam of the incident light in each of the plurality of lenses is 13 degrees or less.

According to the above described construction, aberration is reduced by setting the deflection angle of the principal light beam of the incident light in each of the plurality of lenses making up the telecentric optical system to 13 degrees or less. At the same time, since the distance between the incidence surface of the telecentric optical system, located nearest to the light source, and the light source is shortened, the spread of the incident light into the incidence surface is reduced and the aperture of the telecentric optical system is reduced.

To achieve the above object, the present invention provides an image forming apparatus comprising: a semiconductor laser array having a plurality of laser elements, for emitting a plurality of laser beams in parallel from the plurality of laser elements based on an image signal; an imaging optical system for imaging the plurality of laser beams from the plurality of laser elements on an imaging surface; and a photosensitive material, exposed by the plurality of laser beams imaged on the imaging surface, on which an electrostatic latent image is formed in accordance with the image signal, wherein the imaging optical system comprises: a first lens group disposed at the imaging surface side; a second lens group disposed with a stop sandwiched between the first lens group and the semiconductor laser array; and a third lens group disposed with a first distance provided between it and the second lens group and with a second distance smaller than the first distance provided between it and the semiconductor laser array, for forming the composite focus of the imaging surface side at the center of the stop in conjunction with the second lens group.

According to the above described construction, an optical system (telecentric optical system) between the composite focus of the imaging surface side and the semiconductor laser array is divided into the second lens group and the third lens group and the distance between the third lens group and the semiconductor laser array is shortened, whereby the spread of incident light into the third lens group is reduced and the aperture of the third lens is reduced. Also, a principal light beam of the laser beam is bent at two stages, the second lens group and the third lens group, and the distance between the second lens group and the third lens group is increased, whereby the bend of a principal light beam in the second lens group and the third lens group is reduced, with the result that small aberration is obtained.

BRIEF DESCRIPTION OF THE DRAWINGS

FIG. 2 is a XZ drawing showing an image forming apparatus according to the first embodiment of the present invention.

FIG. 3 is a front view of a semiconductor laser array according to the first embodiment.

DESCRIPTION OF THE PREFERRED EMBODIMENTS

Figure 1:
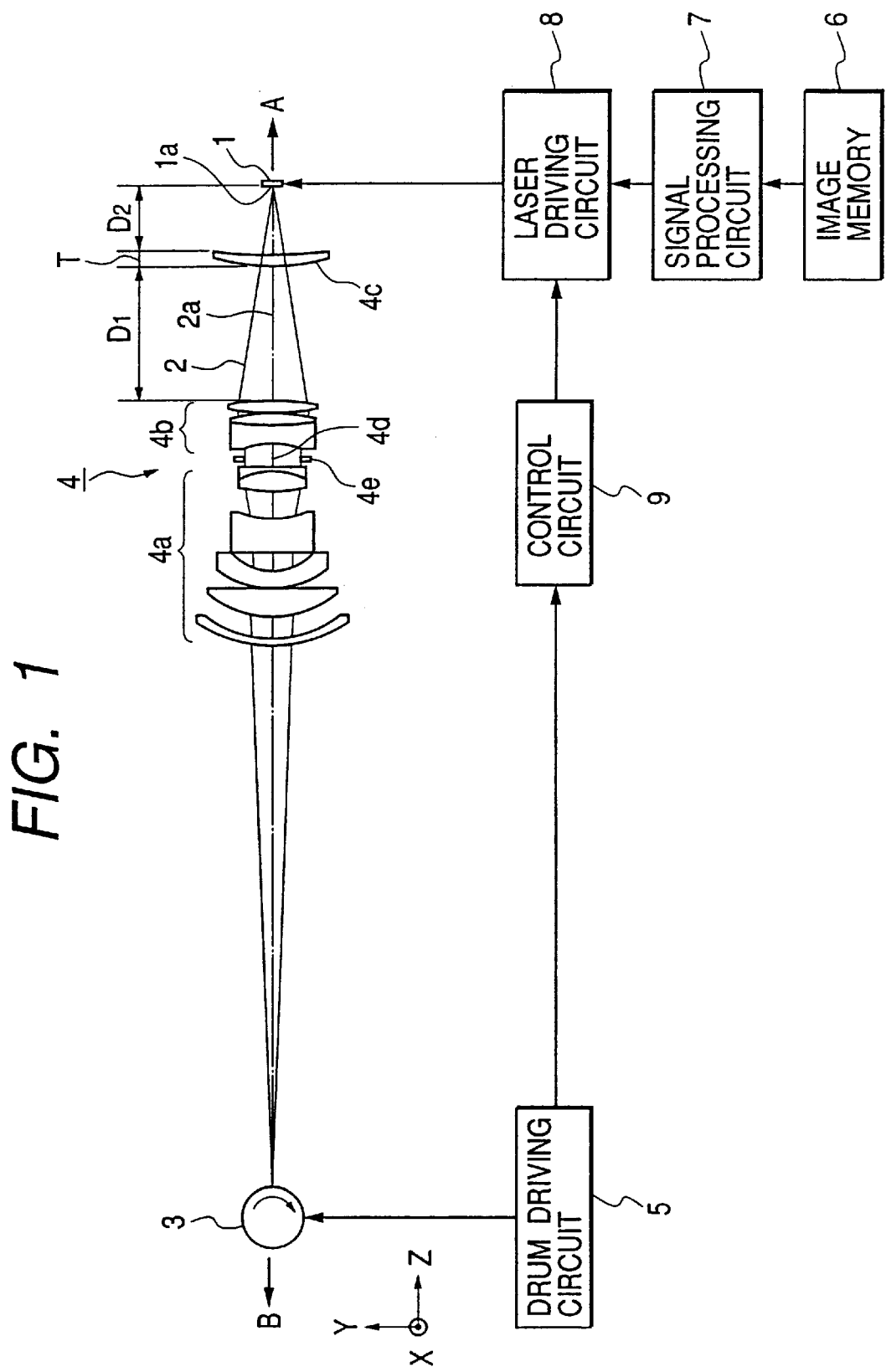
FIG. 1 is a YZ drawing showing an image forming apparatus according to the first embodiment of the present invention.

FIGS. 1 and 2 show brief configurations of an image forming apparatus according to a first embodiment of the present invention. In the figures, X designates a primary scanning direction, Y designates a secondary scanning direction, and Z designates an optical axis direction. The image forming apparatus comprises: a semiconductor laser array 1, disposed at an image surface of reduction side, which has a plurality of laser elements 1a and is capable of emitting a plurality of laser beams 2 in parallel and at the same time from the laser elements 1a; a photosensitive drum 3 rotated by a drum driving circuit 5 described later; an imaging optical system 4 of a magnification optical system for imaging a plurality of laser beams 2 emitted in parallel from the laser elements 1a of the semiconductor laser array 1 on the photosensitive drum 3; a drum driving circuit 5 for rotating the photosensitive drum 3 and outputting a timing signal synchronous with the rotation of the photosensitive drum 3; an image memory 6 for storing image signals; a signal processing circuit 7 for reading the image signals from the image memory 6 and processing the image signals to output a recording signal conforming to a recording pattern; a laser driving circuit 8 for driving the semiconductor laser array 1 by inputting the recording signal from the signal processing circuit 7; and a control circuit 9 for controlling the driving by the laser driving circuit 8 by outputting a control signal to the laser driving circuit 8 synchronously with the timing signal from the drum driving circuit 5.

FIG. 3 shows the semiconductor laser array 1. The semiconductor laser array 1 has a plurality of laser elements 1a two-dimensionally arranged in primary scanning direction X and secondary scanning direction y. In this embodiment, a total of 16800 laser pixels 1a are arranged in a slim area of 50 0.1 mm in the primary scanning direction X; that is, 1400 laser elements 1a arranged with a pitch Px of 36 μm in the primary scanning direction X and 12 laser elements 1a arranged with a pitch Py of 9 μm in the secondary scanning direction at an angle of γ(=14 degrees) with respect to the secondary scanning direction Y.

The image forming apparatus is provided with a charger, a developer, a transferee, and other image forming apparatuses around the photosensitive drum 3 which are not shown. At the preceding stage of the transferer is provided a paper feeding part for feeding recording paper to the transferer, and at the following stage of the transferer are provided a fixing unit for fixing a toner image transferred onto recording paper, a discharging part for discharging recording paper on which a toner image is fixed, and the like.

Figure 4:
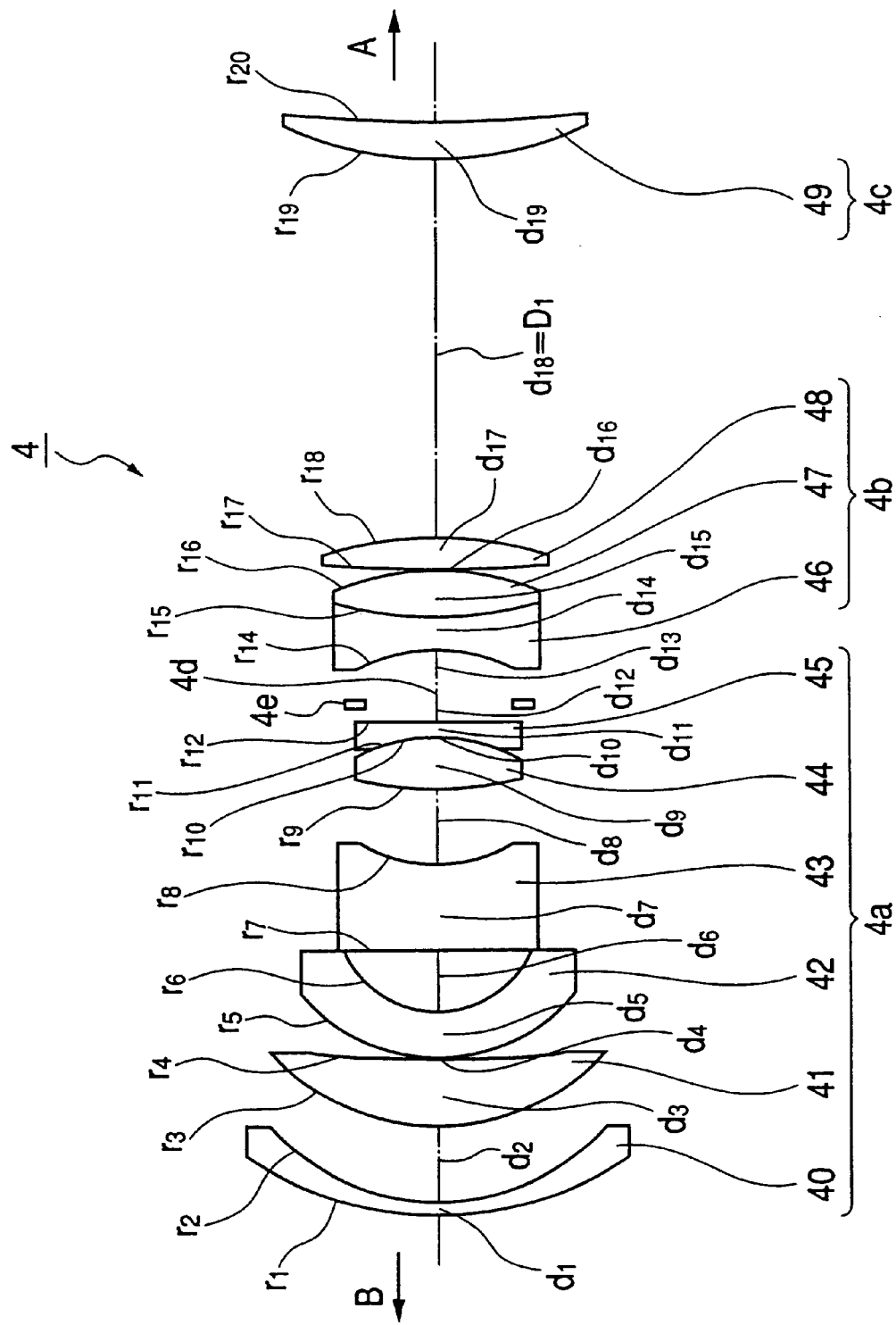
FIG. 4 is a cross sectional view of an imaging optical system according to the first embodiment.

FIG. 4 shows an imaging optical system 4 according to the first embodiment. The imaging optical system 4 comprises: a first lens group 4a, disposed at a photosensitive drum 3 side (magnification side B), for imaging laser beams 2 from a laser array 1; a second lens group 4b disposed with the composite focus 4d of the imaging surface side sandwiched between the first lens group 4a and a semiconductor laser array 1 (reduction side A), for gathering and imaging laser beams 2 from the laser array 1; a third lens group 4c disposed with a first distance ($d_{18}$) $D_1$ provided between it and the second lens group 4b and with a second distance $D_2$ smaller than the first distance $D_1$ provided between it and the laser array 1, for gathering and imaging the laser beams 2 from the array 1 and forming the composite focus 4d of the imaging surface side in conjunction with the second lens group 4b; and a stop 4e disposed at the position of the composite focus 4d of the imaging surface side, for cutting off unnecessary light such as scattered light and the like.

The second lens group 4b and the third lens group 4c, which make up a telecentric optical system, are constructed so that they satisfy a relation of $2<D_1/D_2$. The first distance $D_1$ is the distance from the surface of the second lens group 4b nearest to the reduction side A to the surface of the third lens group 4c nearest to the magnification side B and the distance denotes a maximum value of distances between lenses making up the telecentric optical system. The second distance $D_2$, which is the distance from the surface of the third lens group 4c nearest to the reduction side A to an image surface of the reduction side, denotes the second largest value of distances between lenses making up the telecentric optical system. In this specification, the term "lens group" denotes one or more lenses.

The first lens group 4a comprises: a first lens 40 having negative power, disposed at the magnification side B, with its concave surface facing the reduction side A; a second lens 41 having positive power, disposed at the reduction side A of the first lens 40, with its convex surface facing the magnification side B; a third lens 42 having negative power, disposed at the reduction side A of the second lens 41, with its concave surface facing the reduction side A; a fourth lens 43 having negative power, disposed at the reduction side A of the third lens 42, with its concave surface facing the reduction side A; a fifth lens 44 having positive power, disposed at the reduction side A of the fourth lens 43, with its convex surface facing the reduction side A; and a sixth lens 45 having negative power, disposed at the reduction side A of the fifth lens 44, with its concave surface facing the magnification side B.

The second lens group 4b comprises: a seventh lens 46, disposed at the magnification side B, with its concave surface facing the magnification side B; an eighth lens 47, cemented to the reduction side A of the seventh lens 46, with its convex surface facing the reduction side A; and a ninth lens 48 having positive power, disposed at the reduction side A of the eighth lens 47, with its convex surface facing the magnification side B.

The third lens group 4c comprises a tenth lens 49 having positive power with its convex surface facing the magnification side B.

Next, the operation of the apparatus will be described. The signal processing circuit 7 reads an image signal from the image memory 6 and processes it to output a recording signal conforming to a recording pattern to the laser driving circuit 8. The drum driving circuit 5 rotates the photosensitive drum 3 at a given rotation speed and outputs a timing signal synchronous with the rotation of the photosensitive drum 3 to the control circuit 9. The control circuit 9 outputs a control signal to the laser driving circuit 8 synchronously with the timing signal from the drum driving circuit 5. The laser driving circuit 8 inputs a recording signal from the signal processing circuit 7 based on the control signal from the control circuit 9 and drives the semiconductor laser array 1. The semiconductor laser array 1 emits a plurality of laser beams 2 in parallel to the optical axis direction Z from the laser elements 1a. The plurality of laser beams 2 emitted from the semiconductor laser array 1 enter the imaging optical system 4. The principal light beams 2a of the laser beams 2 incident upon the imaging optical system 4, after being bent by the light gathering action of the third lens group 4c and further bent by the light gathering action of the second lens group 4b, are gathered at the composite focus 4d of the imaging surface side and are imaged on the photosensitive drum 3 by the imaging action of the third lens group 4c, the second lens group 4b, and the first lens group 4a. An electrostatic latent image conforming to the image signal is formed on the photosensitive drum 3. Thereafter, the electrostatic latent image on the photosensitive drum 3 is toner developed by the developer, and the toner image is transferred on recording paper fed from the paper feeding part by the transferer, is fixed by the fixing unit, and is discharged to the discharging part. In this way, a high-quality image is formed on the recording paper.

According to the above described image forming apparatus of the first embodiment, since the telecentric optical system is divided into the second lens group 4b and the third lens group 4c and the third lens group 4c is disposed near to the semiconductor laser array 1, the spread of laser beams 2 incident upon the third lens group 4c is reduced, with the result that the aperture of the third lens group 4c can be reduced and the image forming apparatus can be miniaturized.

Furthermore, since the principal light beams 2a of laser beams 2 from the laser array 1 are bent at two stages, the second lens group 4b and the third lens group 4c, and the distance $D_1$ between the second lens group 4b and the third lens group 4c is enlarged, the bend of the principal light beams 2a of laser beams 2 at the second lens group 4b and the third lens group 4c is reduced, with the result that small aberration is obtained, making it possible to achieve a large screen size and high resolution. For example, high resolution of 2800 dots or more per inch for A3 size can be realized.

Figure 5:
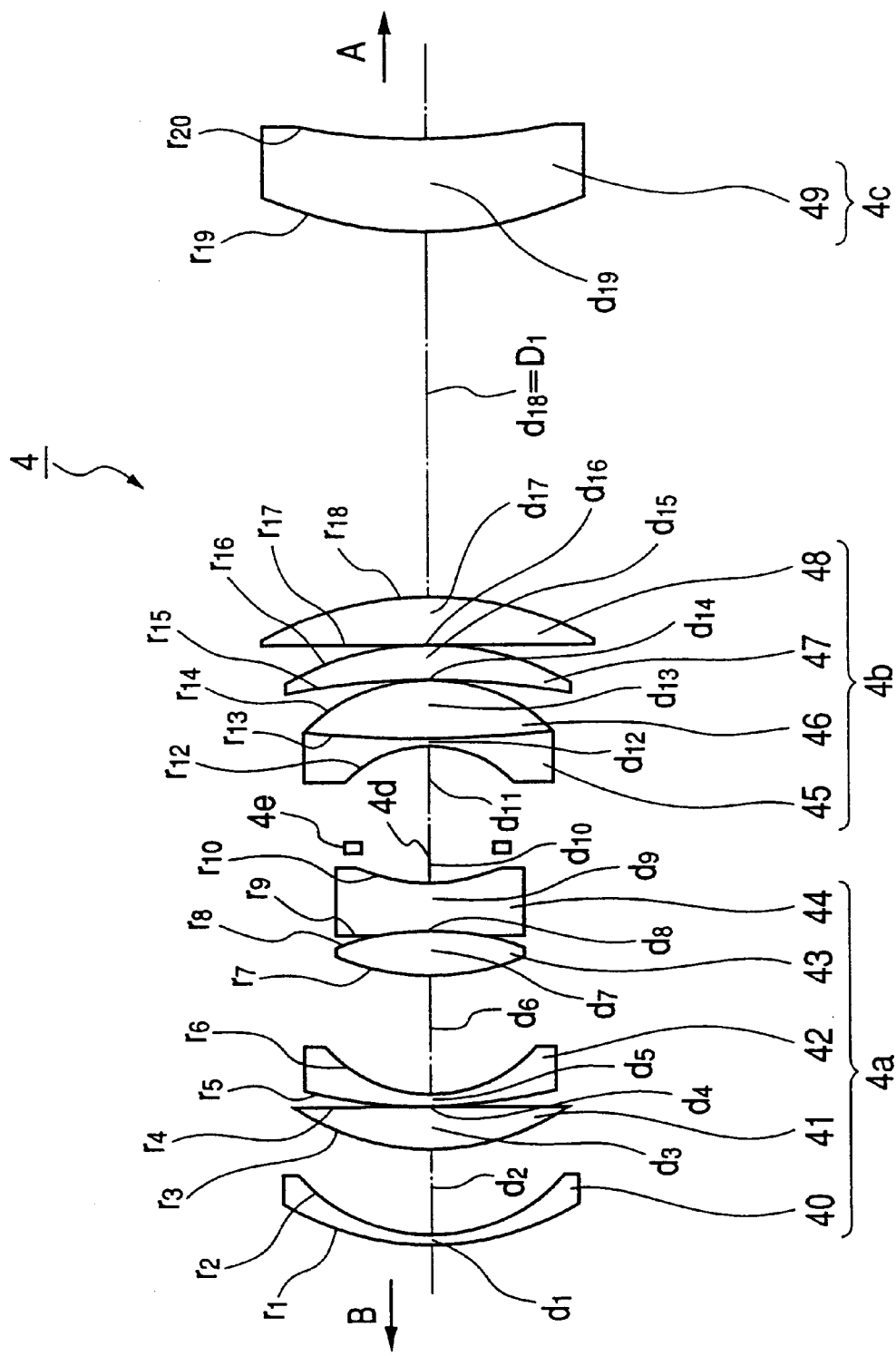
FIG. 5 is a cross sectional view of an imaging optical system according to the second embodiment.

FIG. 5 shows an imaging optical system 4 according to a second embodiment. This imaging optical system 4 is similar to that of the first embodiment in that it comprises the first lens group 4a, the second lens group 4b, the third lens group 4c, and the stop 4e disposed at the position of the composite focus 4d of the imaging surface side The first lens group 4a comprises: a first lens 40 having negative power, disposed at the magnification side B, with its concave surface facing the reduction side A; a second lens 41 having positive power, disposed at the reduction side A of the first lens 40, with its convex surface facing the magnification side B; a third lens 42 having negative power, disposed at the reduction side A of the second lens 41, with its concave surface facing the reduction side A; a fourth lens 43 having positive power, disposed at the reduction side A of the third lens 42, with its convex surface facing the magnification side B; and a fifth lens 44 having negative power, disposed at the reduction side A of the fourth lens 43, with its concave surface facing the reduction side A.

The second lens group 4b comprises: a sixth lens 45, disposed at the magnification side B, with its concave surface facing the magnification side B; a seventh lens 46, cemented to the reduction side A of the sixth lens 45, with its convex surface facing the magnification side B; an eighth lens 47 having positive power, disposed at the reduction side A of the seventh lens 46, with its convex surface facing the reduction side A; and a ninth lens 48 having positive power, disposed at the reduction side A of the eighth lens 47, with its convex surface facing the reduction side A.

The third lens group 4c comprises a tenth lens 49 having positive power with its convex surface facing the magnification side B.

Figure 6:
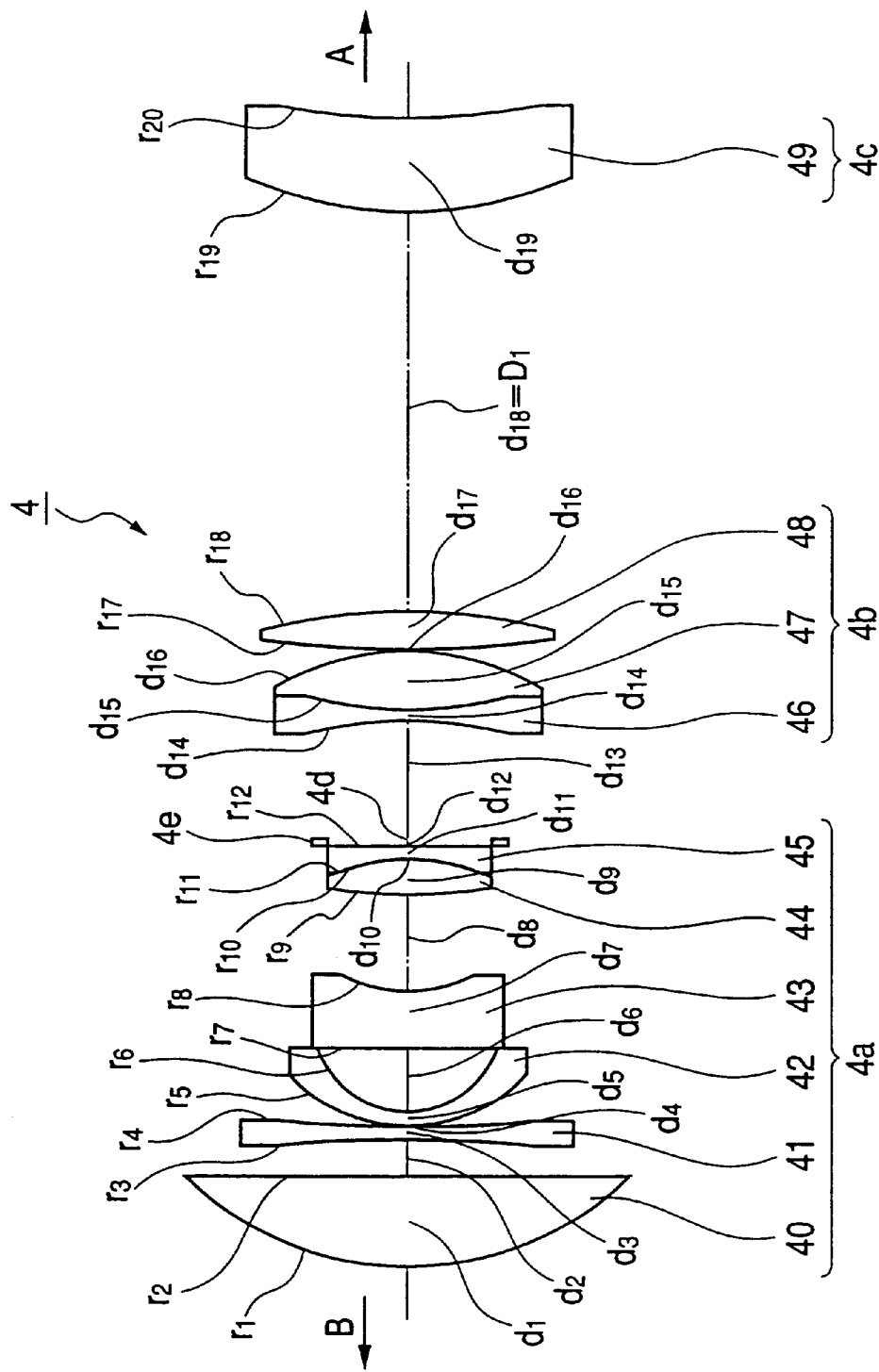
FIG. 6 is a cross sectional view of an imaging optical system according to the third embodiment.

FIG. 6 shows an imaging optical system 4 according to a third embodiment. This imaging optical system 4 is similar to that of the first embodiment in that it comprises the first lens group 4a, the second lens group 4b, the third lens group 4c, and the stop 4e disposed at the position of the composite focus 4d of the imaging surface side.

The first lens group 4a comprises: a first lens 40 having positive power, disposed at the magnification side B, with its convex surface facing the magnification side B; a second lens 41 having negative power, disposed at the reduction side A of the first lens 40, with its concave surface facing the reduction side B; a third lens 42 having negative power, disposed at the reduction side A of the second lens 41, with its concave surface facing the reduction side A; a fourth lens 43 having negative power, disposed at the reduction side A of the third lens 42, with its concave surface facing the reduction side A; a fifth lens 44 having positive power, disposed at the reduction side A of the fourth lens 43, with its convex surface facing the reduction side A; and a sixth lens 45, disposed at the reduction side A of the fifth lens 44, with its concave surface facing the magnification side B.

The second lens group 4b comprises: a seventh lens 46, disposed at the magnification side B, with its concave surface facing the magnification side B; an eighth lens 47, cemented to the reduction side A of the seventh lens 46, with its convex surface facing the reduction side A; and a ninth lens 48 having positive power, disposed at the reduction side A of the eighth lens 47, with its convex surface facing the magnification side B.

The third lens group 3c comprises a tenth lens 49 having positive power with its convex surface facing the magnification side B.

Figure 7:
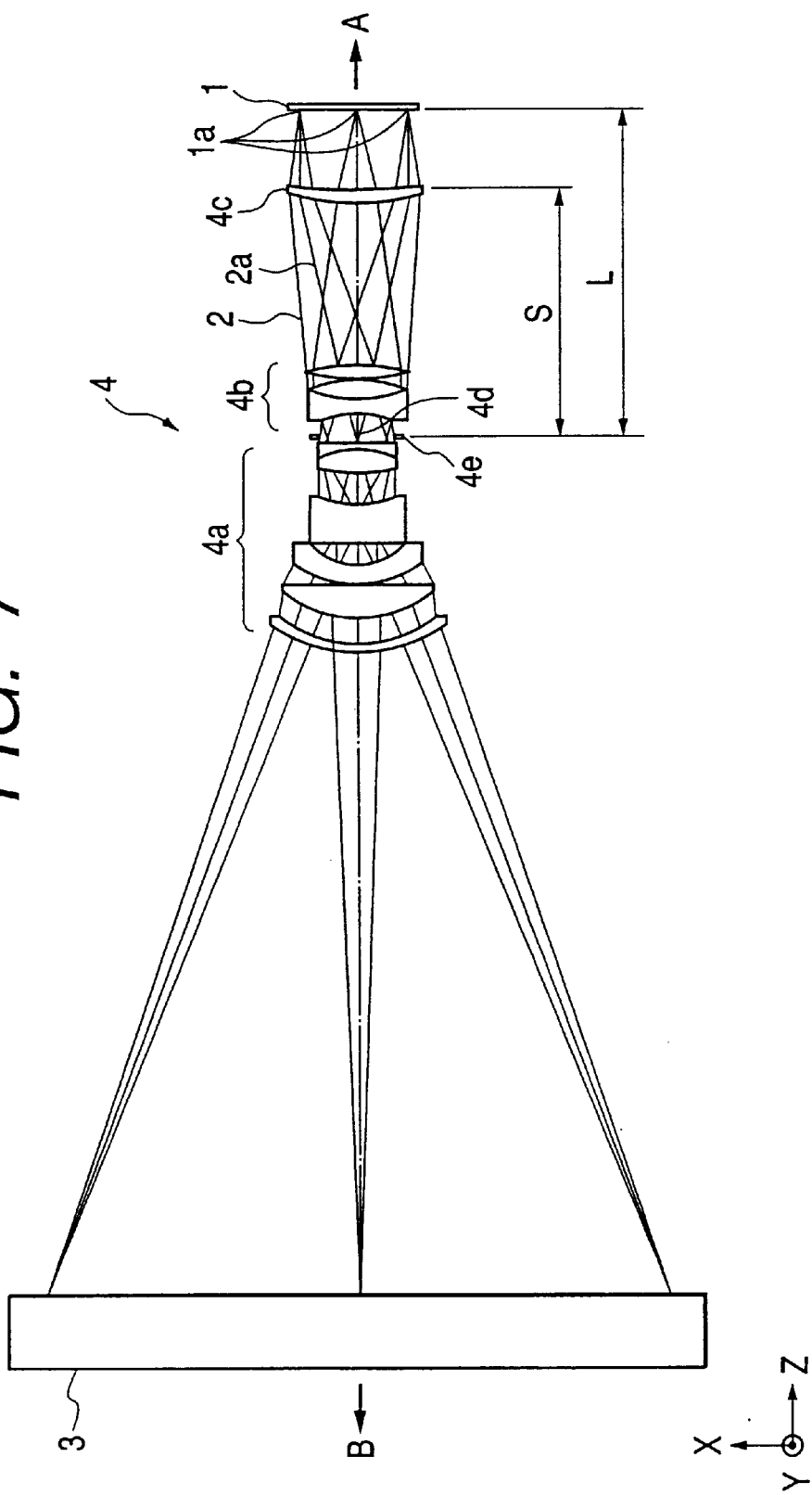
FIG. 7 is a XZ drawing showing an image forming apparatus according to the fourth embodiment of the present invention.

FIG. 7 shows a brief configuration of an image forming apparatus according to a fourth embodiment of the present invention. The fourth embodiment constructs a telecentric optical system so that a relation of 1<2·S/L<2 is satisfied, where S is the distance between a principal point (a reference position of the focal distance of a lens when a light beam would be bent at a point) of one of a plurality of lenses making up the telecentric optical system in the first embodiment, located nearest to the reduction side B, and the composite focus 4d of the imaging surface side, and L is the distance between the laser array 1 and the composite focus 4d of the imaging surface side.

According the fourth embodiment, increasing S/L reduces the distance between the incidence surface of the telecentric optical system, located nearest to the reduction side A, and the laser array 1, and reduces the spread of laser beams 2 into the incidence surface, with the result that the aperture of the telecentric optical system is reduced, contributing to miniaturization of the telecentric optical system. Also, increasing S/L increases the distance between the incidence surface of the telecentric optical system, located nearest to the reduction side A, and the composite focus 4d of the imaging surface side, and reduces the bend of the principal light beams of laser beams 2 in the telecentric optical system, with the result that small aberration is obtained, making it possible to achieve high resolution. Furthermore, a large design tolerance can be specified. As long as the above relation of 1<2·S/L<2 is satisfied, the telecentric optical system may comprise one lens group or three or more lens groups.

Figure 8:
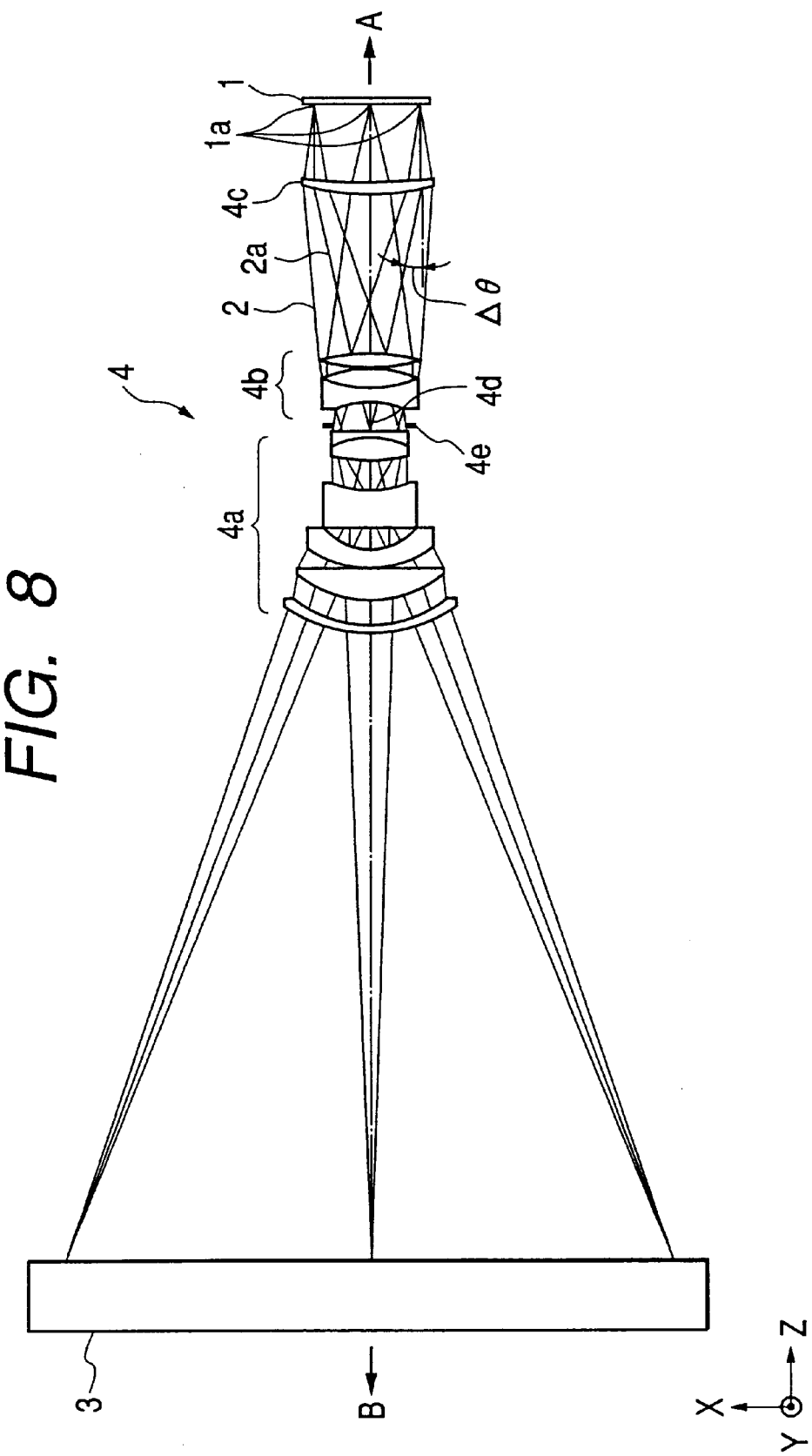
FIG. 8 is a XZ drawing showing an image forming apparatus according to the fifth embodiment of the present invention.
Figure 9A:
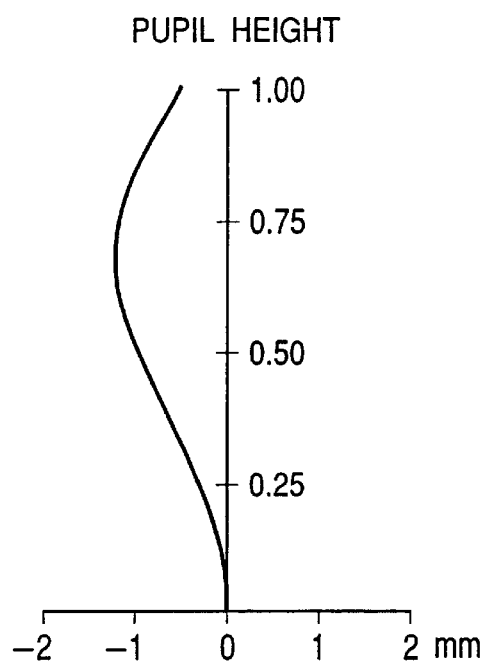
FIGS. 9A, 9B and 9C are various aberration diagrams in the first embodiment of the present invention; 9A is a spherical aberration diagram, 9B is an astigmatism diagram, and 9C is a distortion aberration diagram.
Figure 9B:
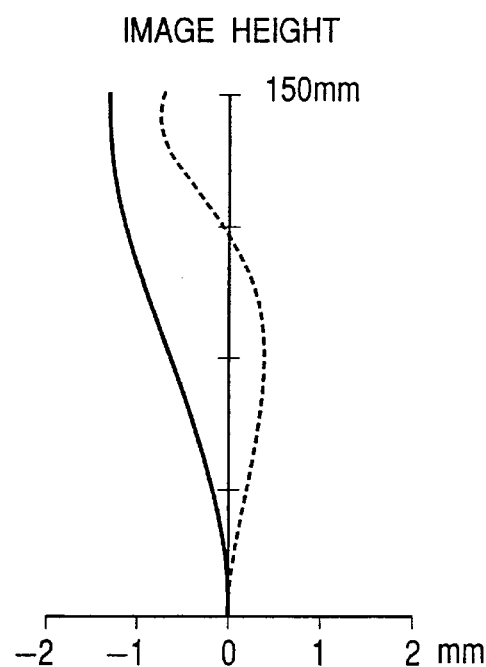
Figure 9C:
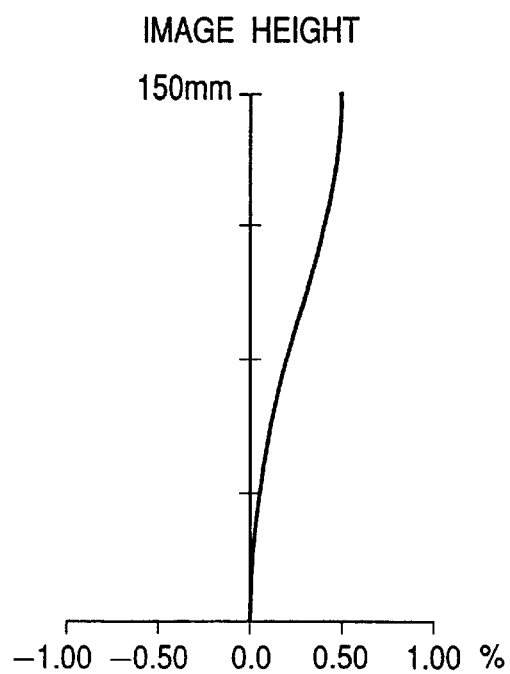
Figure 10:
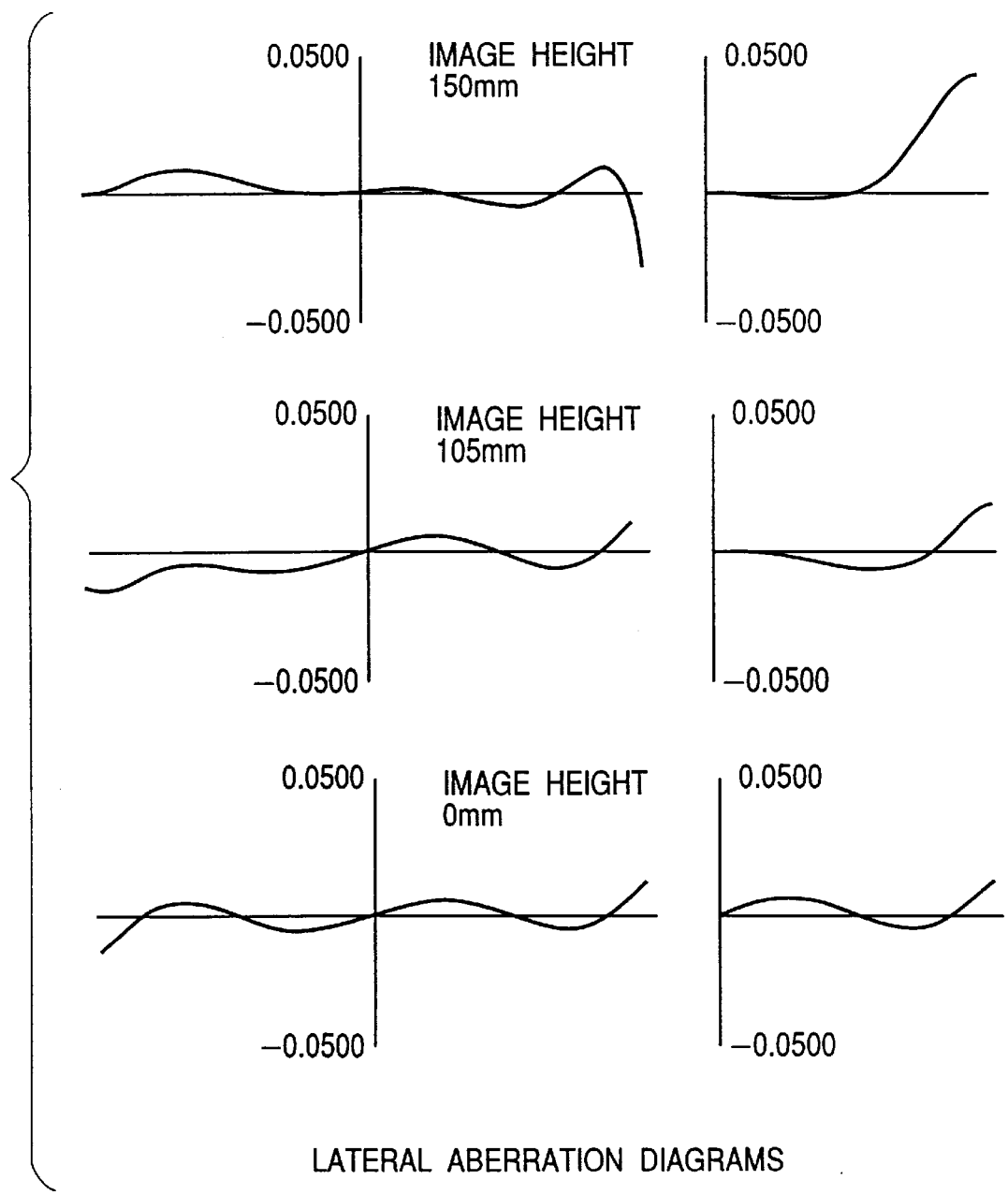
FIG. 10 is lateral aberration diagrams in the first embodiment of the present invention.
Figure 11A:
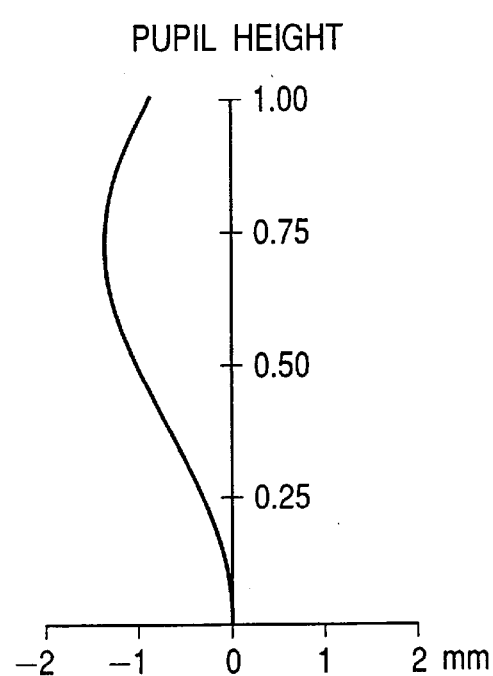
FIGS. 11A, 11B and 11C are various aberration diagrams in the second embodiment of the present invention; 11A is a spherical aberration diagram, 11B is an astigmatism diagram, and 11C is a distortion aberration diagram.
Figure 11B:
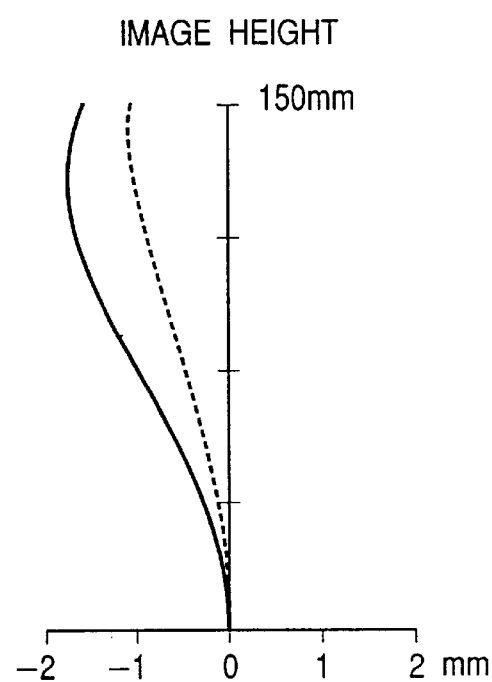
Figure 11C:
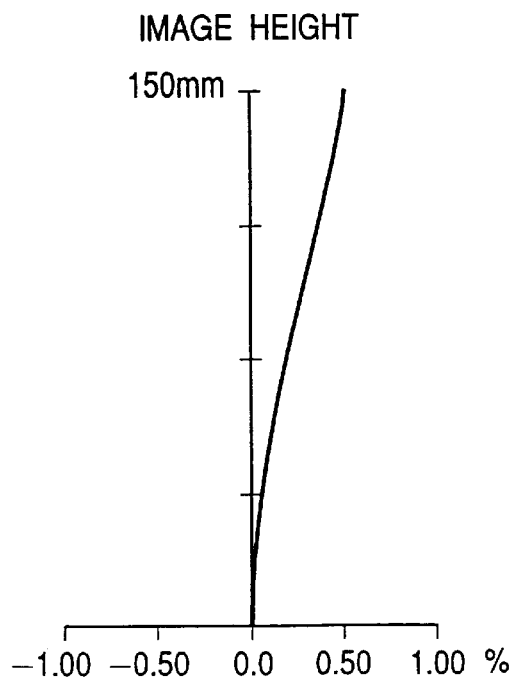
Figure 12:
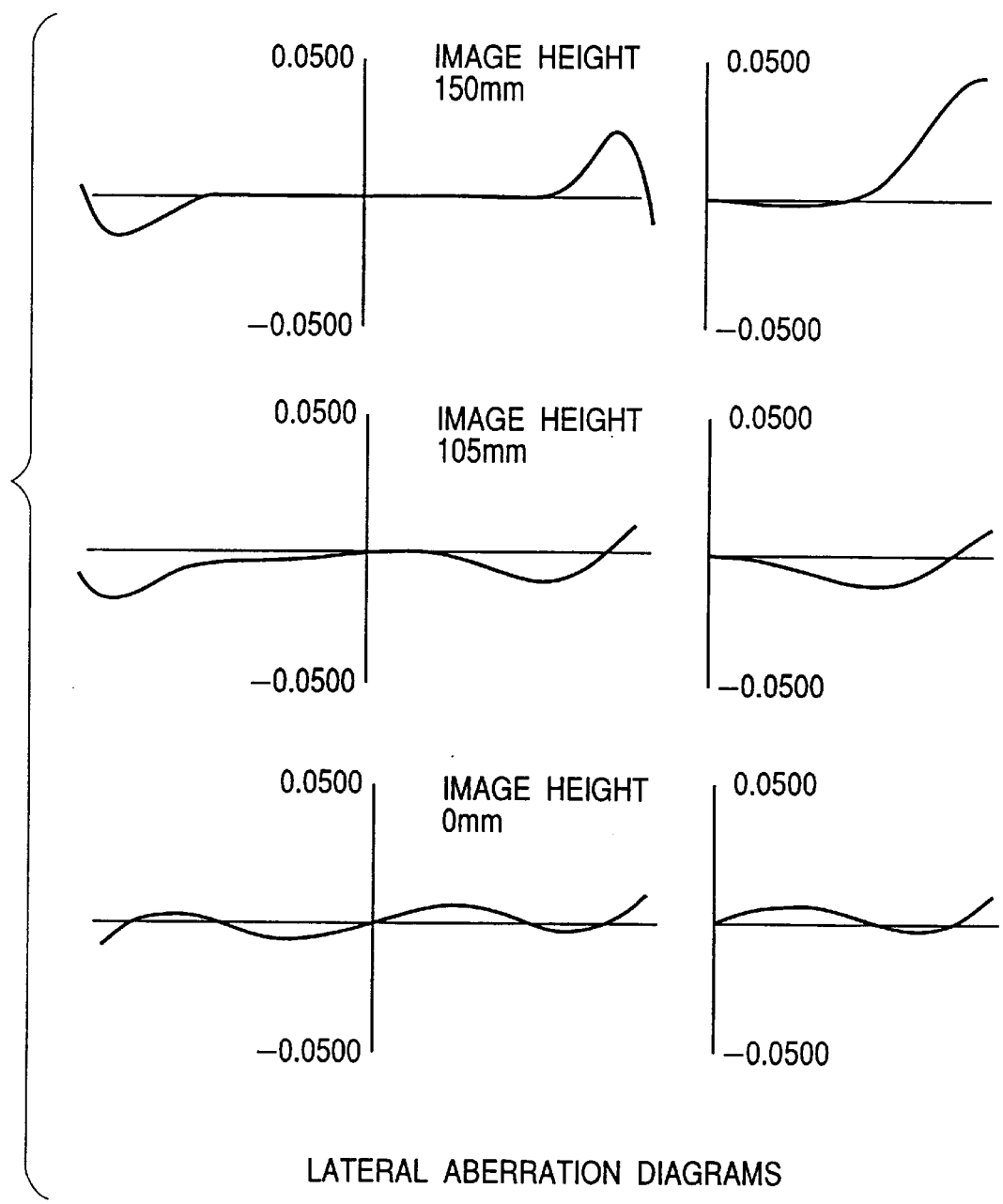
FIG. 12 is lateral aberration diagrams in the second embodiment of the present invention.
Figure 13A:
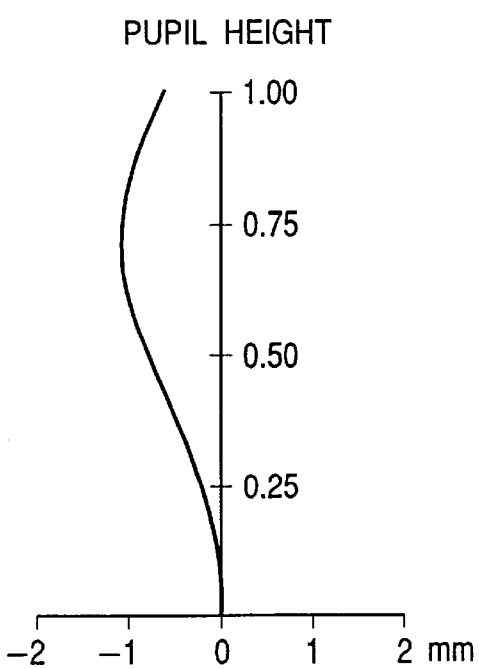
FIGS. 13A, 13B and 13C are various aberration diagrams in the third embodiment of the present invention; 13A is a spherical aberration diagram, 13B is an astigmatism diagram, and 13C is a distortion aberration diagram.
Figure 13B:
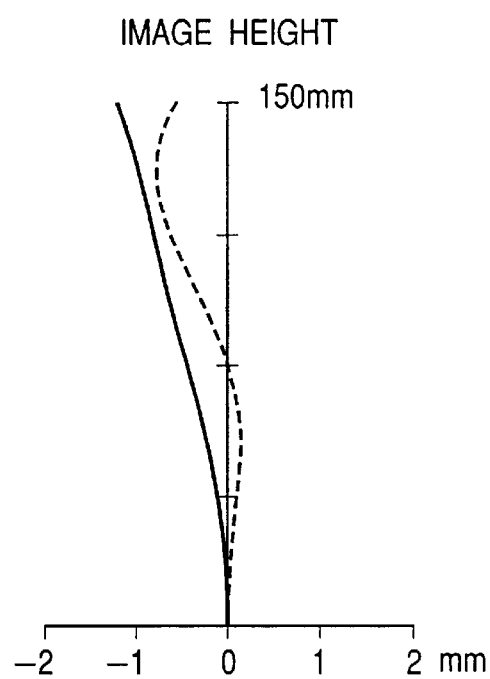
Figure 13C:
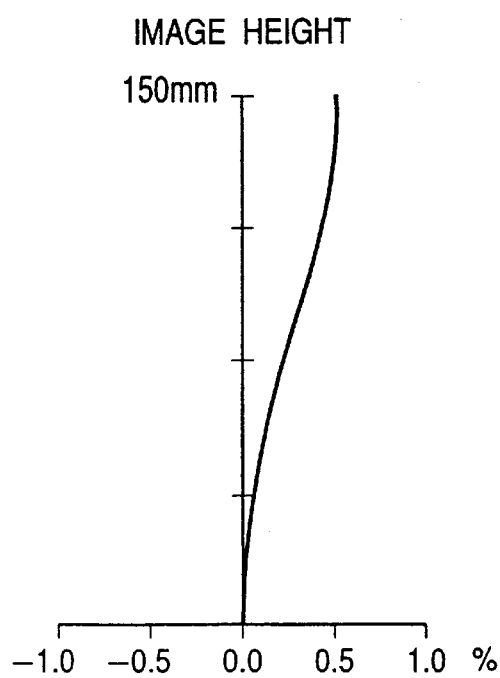
Figure 14:
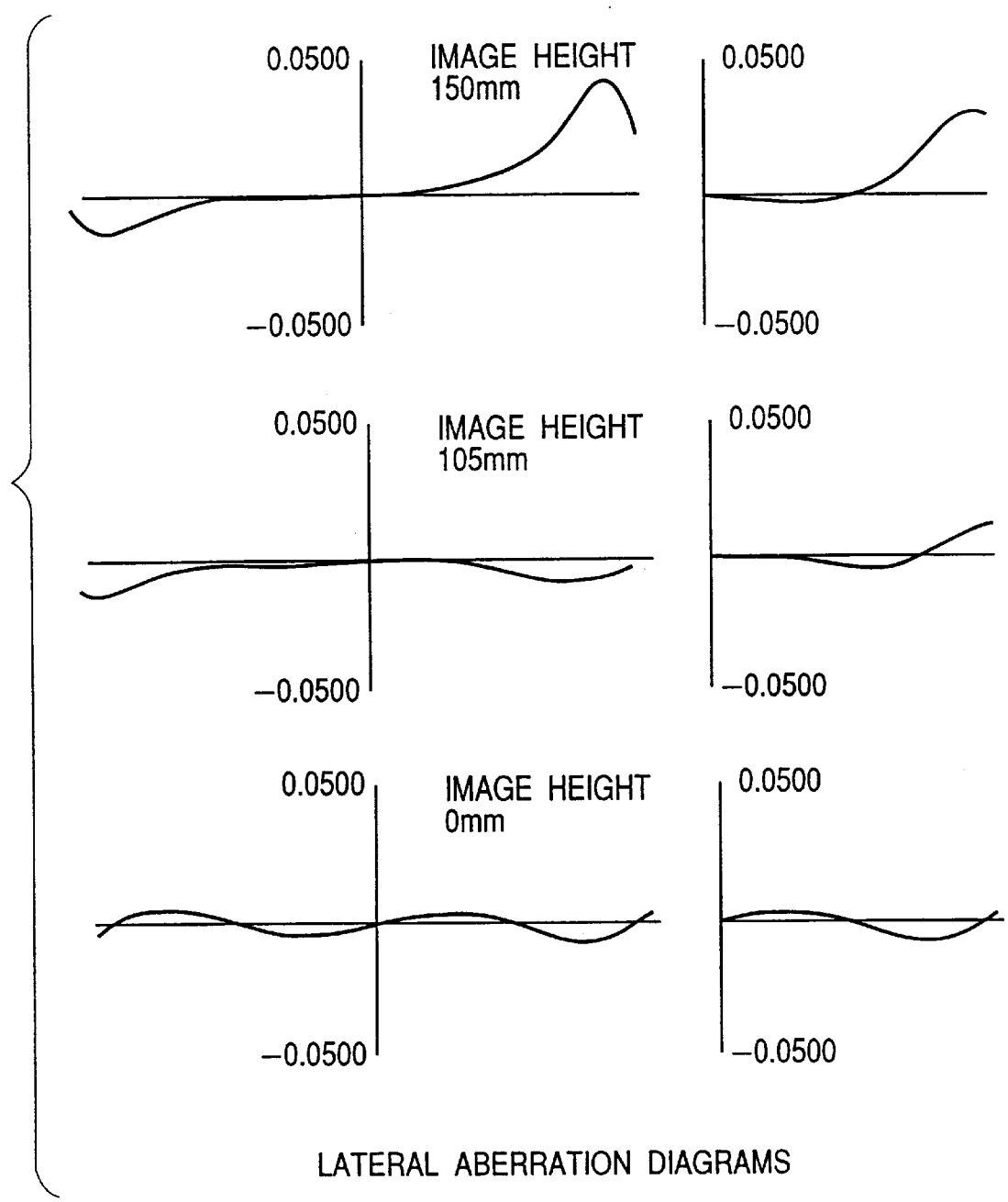
FIG. 14 is lateral aberration diagrams in the third embodiment of the present invention.
Figure 15:
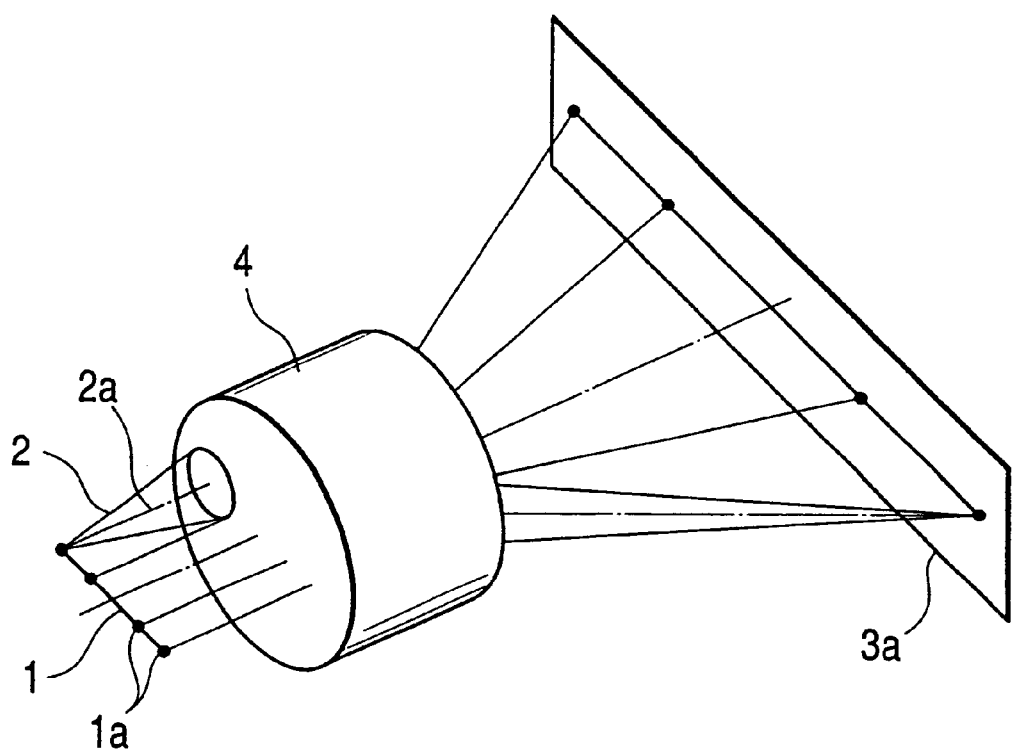
FIG. 15 is a diagram showing a conventional image forming apparatus.

FIG. 8 shows a brief configuration of an image forming apparatus according to a fifth embodiment of the present invention. The fifth embodiment constructs the second lens group 4b and the third lens group 4c in the first embodiment so that a deflection angle $\Delta\theta$ (an angle difference across a lens) of the principal light beams 2a of laser beams 2 in each of the lenses making up the telecentric optical system is 13 degrees or less. According to the fifth embodiment, reduced aberration will enable high resolution. Also, a reduced distance between the incidence surface of the telecentric optical system, located nearest to the light source, and the laser array 1 will reduce the spread of laser beams 2 into the incidence surface and reduce the aperture of the telecentric optical system, enabling miniaturization. As long as the condition that a deflection angle of the principal light beams 2a of laser beams 2 is 13 degrees or less is satisfied, the telecentric optical system may comprise one lens group or three or more lens groups.

EMBODIMENT EXAMPLES

Hereinafter, embodiment examples of the present invention will be described using specific numeric values.

Embodiment Example 1

Table 1 shows lens data of an imaging optical system 4 of an embodiment example 1 corresponding to the first embodiment shown FIG. 4.

TABLE 1

| Surface No. i | Curvature radius ri | Surface distance di | Refractive index nj | Abbe number vj |
|---|---|---|---|---|
| 1 | 79.787 | 2.400 | 1.761818 | 26.209 |
| 2 | 54.557 | 17.723 | | |
| 3 | 59.224 | 14.330 | 1.846663 | 23.7848 |
| 4 | 371.522 | 0.100 | | |
| 5 | 44.512 | 8.415 | 1.846663 | 23.7848 |
| 6 | 23.994 | 13.423 | | |
| 7 | 36756.0 | 20.000 | 1.487489 | 70.4412 |
| 8 | 36.944 | 17.695 | | |
| 9 | 144.342 | 11.192 | 1.804199 | 46.5025 |
| 10 | −42.186 | 0.1000 | | |
| 11 | −58.948 | 3.549 | 1.58143 | 40.8876 |
| 12 | 528.605 | 2.792 | | |
| 13 | Stop | 13.098 | | |
| 14 | −55.313 | 8.041 | 1.846663 | 23.7848 |
| 15 | 88.711 | 10.637 | 1.658435 | 50.8546 |
| 16 | −54.793 | 0.1000 | | |
| 17 | 453.429 | 6.406 | 1.804199 | 46.5025 |
| 18 | −104.659 | 85.154 | | |
| 19 | 90.991 | 7.776 | 1.804199 | 46.5025 |
| 20 | 445.776 | | | |

In Table 1, $r_i$ designates the curvature radius of a lens of i-th surface, and di designates the surface distance of each lens, and the distance between a lens surface and a stop. $n_j$ designates the refractive index of each lens in d line and $V_j$ designates an Abbe number.

An effective focal distance f, magnification M of magnification side, image height IMH, and numerical aperture NAO of object side of an imaging optical system having the above described lens data are set respectively as described below.

f=70 mm, M=6, IMH=150 mm, NAO=0.169

A first distance $D_1$, a second distance $D_2$, and the thickness T of a tenth lens 49 are set to 85.154 mm, 41.114 mm, and 7.776 mm, respectively, and therefore $D_1/D_2$ is equal to 2.07. The distance S from the principal point of the third lens group 4c to the composite focus of the imaging surface side is 128 mm and the distance L from the laser array 1 to the composite focus 4d of the imaging surface side is set to 170 mm, and therefore 2·S/L is equal to 1.50. The deflection angles Δθ of the principal light beams 2a of laser beams 2 in the seventh lens 46, the eighth lens 47, the ninth lens 48, and the tenth lens 49 making up the telecentric optical system are −4.5, 4.6, −4.9, and −11.6 degrees, respectively. The sign of the deflection angles Δθ is plus for the clockwise direction and minus for the counterclockwise direction when a light beam incident at the right of a lens travels to the left. The same is also true for the embodiments described below.

FIGS. 9A, 9B, 9C, and FIG. 10 show the spherical aberration, astigmatism, distortion aberration, and the lateral aberrations in image heights 0, 105, and 150 mm in the image face of the magnification side of the imaging optical system constructed as described above, respectively. These values are ones calculated when a reference wavelength of the semiconductor laser array 1 is 780 nm.

Embodiment Example 2

Table 2 shows lens data of the imaging optical system of an embodiment example 2 corresponding to the second embodiment shown in FIG. 5.

TABLE 2

| Surface No. i | Curvature radius ri | Surface distance di | Refractive index nj | Abbe number vj |
|---|---|---|---|---|
| 1 | 68.808 | 2.000 | 1.785896 | 43.9344 |
| 2 | 40.690 | 18.884 | | |
| 3 | 61.222 | 9.014 | 1.846663 | 23.7848 |
| 4 | 3427.6 | 0.100 | | |
| 5 | 95.900 | 2.160 | 1.603110 | 60.6946 |
| 6 | 31.960 | 25.445 | | |
| 7 | 57.151 | 9.027 | 1.804199 | 46.5025 |
| 8 | −81.563 | 0.100 | | |
| 9 | −313.66 | 11.100 | 1.784719 | 25.7208 |
| 10 | 43.929 | 6.724 | | |
| 11 | Stop | 22.782 | | |
| 12 | −26.723 | 2.000 | 1.846663 | 23.7848 |
| 13 | 342.55 | 12.643 | 1.589128 | 61.2526 |
| 14 | −40.334 | 0.100 | | |
| 15 | −13920 | 6.883 | 1.804199 | 46.5025 |
| 16 | −64.705 | 0.1000 | | |
| 17 | −2789.1 | 10.939 | 1.804199 | 46.5025 |
| 18 | −73.693 | 77.606 | | |
| 19 | 93.825 | 20.000 | 1.804199 | 46.5025 |
| 20 | 165.284 | | | |

An effective focal distance f, magnification M of magnification side, image height IMH, and numerical aperture NAO of object side of an imaging optical system having the above described lens data are set respectively as described below.

f=70 mm, M=6, IMH=150 mm, NAO =0.169

A first distance $D_1$, a second distance $D_2$, and the thickness T of a tenth lens 49 are set to 77.606 mm, 29.965 mm, and 20.000 mm, respectively, and therefore $D_1/D_2$ is equal to 2.59. The distance S from the principal point of the third lens group 4c to the composite focus of the imaging surface side is 134 mm and the distance L from the laser array 1 to the composite focus 4d of the imaging surface side is set to 180 mm, and therefore 2·S/L is equal to 1.49. The deflection angles Δθ of the principal light beams 2a of laser beams 2 in the sixth lens 45, the seventh lens 46, the eighth lens 47, the ninth lens 48, and the tenth lens 49 making up the telecentric optical system are 2.3, 5.2, −7.1, −11.2, and −6.6 degrees, respectively.

FIGS. 11A, 11B, 11C, and FIG. 12 show the spherical aberration, astigmatism, distortion aberration, and the lateral aberrations in image heights 0, 105, and 150 mm in the image surface of the magnification side of the imaging optical system constructed as described above, respectively.

Embodiment Example 3

Table 3 shows lens data of the imaging optical system of an embodiment example 3 corresponding to the third embodiment shown in FIG. 6.

TABLE 3

| Surface No. i | Curvature radius ri | Surface distance di | Refractive index nj | Abbe number vj |
|---|---|---|---|---|
| 1 | 71.628 | 18.251 | 1.834000 | 37.3451 |
| 2 | 1252.6 | 8.737 | | |
| 3 | −455.89 | 2.400 | 1.846663 | 23.7848 |
| 4 | 391.48 | 0.100 | | |
| 5 | 36.352 | 2.858 | 1.804199 | 46.5025 |
| 6 | 21.368 | 13.785 | | |
| 7 | 1597.3 | 12.577 | 1.589128 | 61.2526 |
| 8 | 35.524 | 20.969 | | |
| 9 | 443.61 | 7.351 | 1.696802 | 55.4597 |
| 10 | −34.199 | 0.1000 | | |
| 11 | −44.538 | 2.400 | 1.672701 | 32.1733 |
| 12 | −201.57 | 0.100 | | |
| 13 | Stop | 26.994 | | |
| 14 | −100.09 | 2.400 | 1.846663 | 23.7848 |
| 15 | 123.95 | 12.698 | 1.589128 | 61.2526 |
| 16 | −56.086 | 0.1000 | | |
| 17 | 223.12 | 8.179 | 1.804199 | 46.5025 |
| 18 | −138.739 | 85.758 | | |
| 19 | 88.897 | 20.000 | 1.804199 | 46.5025 |
| 20 | 205.17 | | | |

An effective focal distance f, magnification M of magnification side, image height IMH, and numerical aperture NAO of object side of an imaging optical system having the above described lens data are set respectively as described below.

f=70 mm, M=6, IMH=150 mm, NAO=0.169

A first distance $D_1$, a second distance $D_2$, and the thickness T of a tenth lens 49 are set to 85.758 mm, 29.977 mm, and 20.000 mm, respectively, and therefore $D_1/D_2$ is equal to 2.86. The distance S from the principal point of the third lens group 4c to the composite focus of the imaging surface side is 150 mm and the distance L from the laser array 1 to the composite focus 4d of the imaging surface side is set to 196 mm, and therefore 2·S/L is equal to 1.53. The deflection angles Δθ of the principal light beams 2a of laser beams 2 in the seventh lens 46, the eighth lens 47, the ninth lens 48, and the tenth lens 49 making up the telecentric optical system are −3.1, 3.8, 7.0, and 9.0 degrees, respectively.

FIGS. 13A, 13B, 13C, and FIG. 14 show the spherical aberration, astigmatism, distortion aberration, and the lateral aberrations in image heights 0, 105, and 150 mm in the image surface of the magnification side of the imaging optical system constructed as described above, respectively.

The present invention can be embodied in various forms without being limited to the above described embodiments and embodiment examples. For example, the third lens group 4c may comprise a plurality of lenses not cemented with each other, comprise a cemented lens in which a plurality of lenses are cemented with each other, or comprise a cemented lens in which a plurality of lenses are cemented with each other, and a lens provided in isolation from the cemented lens.

As has been described above, according to the present invention, since the distance between the incidence surface, located nearest to a light source, of a telecentric optical system existing between the composite focus of an imaging surface side and the light source, and the light source is shortened, the spread of incident light into the telecentric optical system is reduced, with the result that the aperture of the telecentric optical system can be reduced, enabling miniaturization.

Also, since the distance between the incidence surface of the telecentric optical system, located nearest to the light source, and the composite focus of the imaging surface side is lengthened, the bend of the principal light beams of incident light in each of a plurality of lenses making up the telecentric optical system is reduced, with the result that small aberration is obtained, making it possible to achieve high resolution.

Furthermore, a large design tolerance can be specified.

What is claimed is:

1. An imaging optical system for imaging incident light coming vertically from a light source on a imaging surface, comprising:
    a first lens group disposed at said imaging surface side;
    a second lens group disposed with a stop sandwiched between said first lens group and said light source; and
    a third lens group disposed with a first distance provided between the third lens group and said second lens group and with a second distance smaller than said first distance provided between the third lens group and said light source, for forming the composite focus of the imaging surface side at the center of said stop in conjunction with said second lens group.

2. An imaging optical system according to claim 1, wherein said first lens group has an imaging action on said incident light; and
    wherein said second lens group and said third lens group have a light gathering action and an imaging action on said incident light.

3. An imaging optical system according to claim 1, wherein said second lens group and said third lens group are constructed to satisfy a relation of $2<D_1/D_2$, where $D_1$ is said first distance and $D_2$ is said second distance.

4. An imaging optical system according to claim 1, wherein the length of said third lens group in an optical axis direction is constructionally shorter than said first distance.

5. An imaging optical system according to claim 1, wherein said first lens group, said second lens group, and said third lens group make up a magnification optical system.

6. An imaging optical system according to claim 1, wherein said third lens group comprises one lens.

7. An imaging optical system according to claim 1, wherein said third lens group comprises a cemented lens in which a plurality of lenses are cemented with each other.

8. An imaging optical system according to claim 1, wherein said third lens group comprises a cemented lens in which a plurality of lenses are cemented with each other, and a lens provided in isolation from said cemented lens.

9. An imaging optical system according to claim 1, wherein said first lens group comprises: a first lens having negative power, disposed at said imaging surface side, with its concave surface facing said light source; a second lens having positive power, disposed at said light source side of said first lens, with its convex surface facing said imaging surface; a third lens having negative power, disposed at the light source side of said second lens, with its concave surface facing said light source; a fourth lens having negative power, disposed at said light source side of said third lens, with its concave surface facing said light source; a fifth lens having positive power, disposed at said light source side of said fourth lens, with its convex surface facing said light source; and a sixth lens having negative power, disposed at said light source side of said fifth lens, with its concave surface facing said imaging surface;
    wherein said second lens group comprises: a seventh lens, disposed at said imaging surface side, with its concave surface facing said imaging surface; an eighth lens, cemented to said light source side of said seventh lens, with its convex surface facing said light source; and a ninth lens having positive power, disposed at said light source side of said eighth lens, with its convex surface facing said imaging surface; and
    wherein said third lens group comprises a tenth lens having positive power with its convex surface facing said imaging surface.

10. An imaging optical system according to claim 1, wherein said first lens group comprises: a first lens having negative power, disposed at said imaging surface side, with its concave surface facing said light source; a second lens having positive power, disposed at said light source side of said first lens, with its convex surface facing said imaging surface; a third lens having negative power, disposed at the light source side of said second lens, with its concave surface facing said light source; a fourth lens having positive power, disposed at said light source side of said third lens, with its convex surface facing said light source; and a fifth lens having negative power, disposed at said light source side of said fourth lens, with its concave surface facing said light source;
    wherein said second lens group comprises: a sixth lens, disposed at said imaging surface side, with its concave surface facing said imaging surface; a seventh lens, cemented to said light source side of said sixth lens, with its convex surface facing said light source; an eighth lens having positive power, disposed at said light source side of said seventh lens, with its convex surface facing said light source; and a ninth lens, disposed at said light source side of said eighth lens, with its convex surface facing said light source; and
    wherein said third lens group comprises a tenth lens having positive power with its convex surface facing said imaging surface.

11. An imaging optical system according to claim 1, wherein said first lens group comprises: a first lens having positive power, disposed at said imaging surface side, with its convex surface facing said imaging surface; a second lens having negative power, disposed at said light source side of said first lens, with its concave surface facing said light source; a third lens having negative power, disposed at the light source side of said second lens, with its concave surface facing said light source; a fourth lens having negative power, disposed at said light source side of said third lens, with its concave surface facing said light source; a fifth lens having positive power, disposed at said light source side of said fourth lens, with its convex surface facing said light source; and a sixth lens, disposed at said light source of said fifth lens, with its concave surface facing said imaging surface;
    wherein said second lens group comprises: a seventh lens, disposed at said imaging surface side, with its concave surface facing said imaging surface; an eighth lens, cemented to said light source side of said seventh lens, with its convex surface facing said light source; and a ninth lens having positive power, disposed at said light source side of said eighth lens, with its convex surface facing said imaging surface; and
    wherein said third lens group comprises a tenth lens having positive power with its convex surface facing said imaging surface.

12. An imaging optical system for imaging incident light coming vertically from a light source on an imaging surface by using a telecentric optical system comprising a plurality of lenses, wherein said telecentric optical system is constructed so that a relation of 1<2·S/L<2 is satisfied, where S is the distance between a principal point of one of said plurality of lenses, located nearest to said light source, and the composite focus of the imaging surface side formed by said plurality of lenses, and L is the distance between said light source and said composite focus of the imaging surface side.

13. An imaging optical system for imaging incident light coming vertically from a light source on an imaging surface by using a telecentric optical system comprising a plurality of lenses, wherein said telecentric optical system is constructed so that a deflection angle of the principal light beam of said incident light in each of said plurality of lenses is 13 degrees or less.

14. An image forming apparatus comprising: a semiconductor laser array having a plurality of laser elements, for emitting a plurality of laser beams in parallel from said plurality of laser elements based on an image signal; an imaging optical system for imaging said plurality of laser beams from said plurality of laser elements on an imaging surface; and a photosensitive material, exposed by said plurality of laser beams imaged on said imaging surface, on which an electrostatic latent image is formed in accordance with said image signal, wherein said imaging optical system comprises: a first lens group disposed at said imaging surface side; a second lens group disposed with a stop sandwiched between said first lens group and said semiconductor laser array; and a third lens group disposed with a first distance provided between the third lens group and said second lens group and with a second distance smaller than said first distance provided between the third lens group and said semiconductor laser array, for forming the composite focus of the imaging surface side at the center of said stop in conjunction with said second lens group.

15. An image forming apparatus according to claim 14, wherein said first lens group has an imaging action on said plurality of laser beams; and wherein said second lens group and said third lens group have a light gathering action and an imaging action on said plurality of laser beams.

16. An image forming apparatus according to claim 14, wherein said semiconductor laser array has said plurality of laser elements two-dimensionally arranged in primary scanning and secondary scanning directions.

* * * * *